United States Patent Office

2,777,836
Patented Jan. 15, 1957

2,777,836

PRODUCTION OF VINYL CHLORIDE POLYMERS

Kenneth Boothby Everard, Welwyn Garden City, and Ivan Harris, Brookmans Park, England, assignors to Imperial Chemical Industries Limited, London, England, a corporation of Great Britain No Drawing. Application September 24, 1953,
Serial No. 382,203

Claims priority, application Great Britain October 15, 1952

16 Claims. (Cl. 260—92.8)

This invention relates to improvements in the production of vinyl chloride polymers, including copolymers prepared from mixtures of copolymerisable compounds containing at least 50% by weight of vinyl chloride.

In the complete specification accompanying our co-pending British applications Nos. 14,948/50 and 6,862/51, now British Patent No. 699,016, complete specification published October 28, 1953, there is described a process for the production of aqueous dispersions of polymers and copolymers of vinyl chloride by polymerising vinyl chloride, if desired with up to its own weight of copolymerisable material, in the presence of water containing a dissolved polymerisation catalyst, the process being characterised in that emulsifying agent is introduced into the system only after the polymerisation has commenced but before the polymer dispersion formed begins to coagulate.

By this process it is possible to prepare latices containing polymer particles which are large in size, e. g. having diameters with a numerical average of between 0.1 and 0.5$\mu$, and which are very suitable for the production of polymer/plasticiser pastes.

The object of the present invention is to provide an improvement on this process whereby there may be prepared latices containing polymer particles which are still larger in size and which are even more suitable for the production of polymer/plasticiser pastes.

According to the present invention we provide a process for the production of vinyl chloride polymers in which vinyl chloride, if desired with up to its own weight of copolymerisable material, is subjected to polymerisation conditions whilst dispersed by agitation in an aqueous medium containing in solution a polymerisation catalyst and an electrolyte yielding polyvalent metallic cations in aqueous solution, and in which the polymer dispersion formed is stabilised by means of emulsifying agent first introduced into the aqueous medium after the commencement of the polymerisation.

It has been found that by this process, latices may be produced containing polymer particles which have diameters with a numerical average of up to 1$\mu$ or more and which are eminently suitable for the production of polymer/plasticiser pastes. The latices usually also contain polymer particles which are of remarkably uniform size.

Examples of electrolytes which may be used in the process of this invention are copper acetate, magnesium sulphate, calcium hydroxide, barium hydroxide, zinc sulphate, cadmium sulphate, aluminium sulphate and lead acetate. The amount required depends on the particular electrolyte used and particularly on the valency of the metallic cation if the electrolyte is one which yields a divalent cation, the amount used will normally be of the order of that required to provide a cationic concentration of 0.00005 to 0.0008 gm.-ions percent by weight of the aqueous medium. This corresponds, for example, to 0.016 to 0.25% by weight of barium hydroxide octahydrate or 0.004 to 0.06% by weight of calcium hydroxide. If the electrolyte is one yielding a cation of valency higher than two, the amount used will be smaller. For example, if the electrolyte is aluminium sulphate, amounts of the hydrated salt $(Al_2(SO_4)_3 \cdot 18H_2O)$ of the order of 0.002% by weight of the aqueous medium, corresponding to 0.000003 gm.-ions percent, may be used. When using "Hexol" which is reputed to yield a hexavalent cation in aqueous solution and which, according to Hamdi (cf. Kolloid Zeitschrift, 1952, volume 128, page 22) has a formula of $Co(OH)_6Co\ en_{2,3}(NO_3)_6$, amounts as low as 0.0001 to 0.0008% by weight of the aqueous medium have been found to be satisfactory, whilst the use of larger amounts was found liable to prove disadvantageous because of the inhibiting effect of the "Hexol" on the polymerisation.

In order to ensure that the final product of the polymerisation is a latex, it may be necessary to precipitate all or a part of the electrolyte from the aqueous medium before the end of the polymerization. If barium hydroxide or a salt thereof is used this may be precipitated as barium sulphate or stearate at any desired stage of the polymerisation by adding sulphuric or stearic acid. Similarly, calcium hydroxide and its salts may be precipitated as calcium stearate by the addition of stearic acid. The electrolyte may if desired be precipitated at the same time as the emulsifying agent is added by using an emulsifying agent which acts as a precipitant for the electrolyte, e. g. barium hydroxide may, for example, be precipitated by means of potassium laurate. The extent to which it is necessary or advantageous to precipitate the electrolyte from the aqueous medium before the end of the polymerisation depends on the amount present and the valency of the metallic cation. For example, when using electrolytes in which the metallic cation has a valency of three or more and which need, therefore, to be present only in very small amounts, it is generally unnecessary to precipitate any at all in order to obtain the polymerisation product in the form of a latex.

The electrolyte used in the process of the present invention may with advantage be a salt of aluminium since such salts are particularly effective in comparison with other electrolytes on a weight for weight basis and may be used in amounts so small that it is unnecessary to precipitate them from the aqueous medium before the end of the polymerisation. They have a further advantage in that they yield a colourless cation in aqueous solution and therefore do not discolour the vinyl chloride polymer produced.

Among electrolytes yielding divalent cations, barium and calcium hydroxides and salts thereof are very useful in view of the ease with which they may be precipitated as insoluble salts. Furthermore, the stearates of barium and calcium are effective as heat-stabilisers for vinyl chloride polymers and thus, by using stearic acid or a water-soluble salt thereof to effect precipitation, it is possible to produce polymers having heat-stabiliser incorporated in them at the time of formation.

Examples of catalysts which may be used to activate the polymerisation include peroxy compounds such as hydrogen peroxide, and water-soluble persulphates such as alkali metal and ammonium persulphates. The catalyst concentration employed is preferably as low as is compatible with an economical rate of polymerisation.

It is preferred to allow the polymer content of the polymer dispersion to reach at least 0.5 to 1.0% by weight of the aqueous phase plus polymer before emulsifying agent is introduced into the aqueous medium. In this way it is possible to obtain latices containing polymer particles which are particularly large and uniform in size.

The stage of the polymerisation, i. e. the polymer content of the system, at which coagulation of the polymer dispersion may be expected to commence if the latter is not stabilised by the introduction of emulsifying agent depends upon a number of factors, including the rate at which the system is stirred. Under conditions such as are commonly employed in emulsion polymerisation processes, there is a danger of coagulation of the polymer dispersion commencing if the polymer content is allowed to exceed about 5 to 8% by weight of the aqueous phase plus polymer before emulsifying agent is introduced.

The addition of emulsifying agent to the polymerisation system may be effected in one step, in a number of steps or in a continuous stream. It is preferred to keep the concentration of emulsifying agent at all stages of the polymerisation as low as is possible without coagulation of the polymer dispersion occurring. This may best be achieved by adding the emulsifying agent to the system in a slow continuous stream or, failing that, in a step-wise manner.

Any of the usual emulsifying agents may be used in the process of the present invention. These include alkali-metal and ammonium salts of sulphonated or sulphated long-chain hydrocarbons and animal and vegetable fats and oils, water-soluble salts of sulphuric acid esters of fatty alcohols, i. e. alcohols corresponding to fatty acids of animal and vegetable fats and oils, soaps and the ammonium and alkali metal salts of polymeric methacrylic and acrylic acids. Examples of specific suitable emulsifying agents include sodium lauryl sulphate, sodium oleyl sulphate, sodium cetyl sulphate, the sodium salt of sulphonated castor oil, the sodium and ammonium salts of sulphonated or sulphated methyl oleate, potassium laurate, ammonium palmitate, ammonium stearate and ammonium oleate.

The emulsifying agent may if desired be prepared "in situ" by reacting an organic acid which is soluble in the monomer and which contains at least 6 carbon atoms in the hydrocarbon chain with an organic or inorganic base soluble in water. Among the many emulsifying agents which may be prepared in this way there may be mentioned the alkali metal, ammonium or amine salts of lauric, palmitic, linoleic, stearic, dialkyl-succinic, alkyl-naphthalene sulphonic, and sulphated lauric and oleic acids. The materials used for the preparation of the emulsifying agent can be added, dissolved in their respective phases, i. e. the organic acid may be dissolved in the monomer or a part of the monomer, and the base added in the form of an aqueous solution after the commencement of the polymerisation in one or a number of portions or continuously during the course of at least a portion of the remainder of the polymerisation. It is found that by preparing the emulsifying agent "in situ," polymer latices of increased stability may be produced.

Additional quantities of monomeric material may be introduced into the polymerisation system as the polymerisation proceeds if desired, the size of the polymer particles in the final latex depending on the total quantity of monomeric material polymerized. There is a limit to the particle size which can be achieved in any given polymerisation system, however, since the final solids content of the polymer latex produced cannot be increased beyond a certain maximum value without coagulation occurring. If water is added to the polymerisation system as well as fresh monomeric material, however, particles of exceptionally large size may be obtained. The fresh monomeric material may be added in the form either of liquid or vapour.

Owing to the use of restricted amounts of emulsifying agent, slow rates of stirring will normally be adopted in order to prevent coagulation of the dispersion. As a result, there may be a tendency for liquid monomeric material to separate out from the dispersion. This may be prevented by the use of a stirrer which ensures adequate dispersion of the liquid monomer without causing undue turbulence, e. g. a slow-speed stirrer having two or more sets of blades mounted vertically above each other on a single shaft.

If it is desired to produce very large polymer particles of uniform size, polymer particles produced by the process of the present invention may be used as "seed" in a further emulsion polymerisation process; e. g. a portion of polymer latex produced by the process of the present invention may be introduced into a second polymerisation mixture before polymerisation of the latter is initiated, with the result that very large particles are obtained.

Examples of compounds which may be copolymerised with vinyl chloride by the process of this invention include vinyl acetate, vinylidene chloride, acrylonitrile, ethyl acrylate, methyl methacrylate, maleic acid, fumaric acid, diethyl maleate and diethyl fumarate. If fresh monomeric material is added to the polymerisation system during a copolymerisation process it is preferable, in order to obtain a homogeneous copolymer, to add the individual monomers at rates such that their relative proportions remain approximately constant throughout the polymerisation.

As described in more detail in the complete specification accompanying our copending British applications Nos. 14,948/50 and 6,862/51, there may be introduced into the polymerisation system initially an amount of vinyl chloride such that the fall in vapour pressure observed as the polymerisation proceeds, owing to the disappearance of liquid monomer from the system, gives an indication of the time at which the polymer content of the polymer dispersion reaches the value at which emulsifying agent is to be introduced, further vinyl chloride being introduced after, but only after, the fall in vapour pressure is observed. In this way, the danger of the polymerisation being allowed inadvertently to pass the stage at which coagulation occurs before the emulsifying agent is introduced may be removed.

When operating by the preferred method, the balance of the monomeric material to be polymerised may be added at the same time as the emulsifying agent is added to stabilise the polymer dispersion, or subsequently, and may be added in one portion or in a number of portions or continuously as desired.

The polymer latices produced by the process of the present invention are not easily coagulated by the addition of electrolytes, i. e. they have high salt numbers, but tend to sediment rather rapidly, possibly owing to the large size of the polymer particles which they contain.

The solid polymer may be isolated from the latices by spray-drying but it may be necessary to add further emulsifying agent before the spray-drying step in order to prevent premature separation of the polymer. The emulsifying agent added may, but need not, be the same as that used during the polymerisation. Alternatively, the latices may be coagulated, e. g. by addition of an electrolyte, and the resulting slurry washed and then dried in an oven. Drying causes partial aggregation of the polymer particles but the latter may be separated, e. g. by milling.

The polymer may be modified by the addition of plasticisers, pigments, fillers and heat and light stabilisers, as desired, and may be used in the production of coatings, films, and shaped articles by moulding, extrusion, calendering and other processes of treatment and fabrication commonly applied to vinyl chloride polymers.

As indicated hereinbefore, the polymer is particularly suitable for the production of pastes by mixing with plasticisers. Examples of plasticisers which may be used for this purpose include tricresyl phosphate, dibutyl sebacate, dibutyl phthalate and branched chain actyl and nonyl phthalates, the amount of plasticiser employed usually lying between about 50% and 150% by weight of the polymer. The mixing is normally carried out at room temperature, suitable mixers including the Werner-Pfleiderer, Baker-Perkins and paddle types. The pastes obtained have very low viscosities in relation to the concentration of polymer which they contain and are very suitable for the production of shaped articles and coatings by the usual techniques of moulding, spreading, casting and dipping.

Our invention is illustrated, but not limited, by the following examples in which all parts are by weight.

Example I

The polymerisation described in this example was carried out in a stainless steel cylindrical pressure vessel of diameter 18 inches and depth 34 inches and having a rounded bottom. The vessel was equipped with a rotatable screw stirrer, which consisted of two pairs of blades, one pair 7½ inches above the other, on a shaft concentric with the axis of the cylindrical vessel. Each blade was mounted with its axis horizontal and its surface at an angle of 15° to the vertical. The cylinder of liquid swept out by this stirrer had a diameter of 11 inches.

Into the pressure vessel were introduced the following ingredients: (1) 65 parts of barium hydroxide actahydrate; (2) 65,000 parts of distilled water; (3) 12 parts of ammonium persulphate; and, after displacing the air in the vessel with nitrogen, (4) 6,500 parts of vinyl chloride.

Water was circulated around the jacket of the vessel so as to maintain its temperature at 50° C., while at the same time the contents were stirred by rotating the stirrer at 80 R. P. M. After 2½ hours the pressure in the vessel began to fall, whereupon the following additional ingredients were injected: (5) normal sulphuric acid in quantity equivalent to the amount of barium hydroxide used; (6) 145 parts of a 50% aqueous solution of the sodium salt of sulphonated methyl oleate; (7) a further 31,800 parts of vinyl chloride. After a total reaction time of 20 hours, the polymerisation was discontinued by venting the remaining monomer after the injection of a further 145 parts of the emulsifying agent (ingredient 6).

On opening the pressure vessel, it was found to contain a small proportion of coarse polymer partly adhering to the sides and partly floating in a polymer latex of solids content 26% by weight of the aqueous phase plus solids and particle diameter 1 micron.

The latex was spray-dried, and the dry material comminuted in a mill prior to compounding with tricresyl phosphate to form stable pastes which had the following viscosities (in poises):

| Parts of Polymer | Parts of Plasticiser | Initial viscosity at 25° C. | Viscosity at 45° C. after ageing at 45° C. for 3 hours |
|---|---|---|---|
| 50 | 50 | 28 | 11 |
| 60 | 40 | 316 | 172 |

Example II

Into the stainless steel pressure vessel used in Example I were introduced the following ingredients: (1) 65,000 parts of distilled water; (2) 15.5 parts calcium hydroxide; (3) 15 parts of an aqueous solution of copper sulphate containing 0.2% by weight of copper ion; (4) 24 parts of ammonium persulphate. After evacuating the vessel to a pressure of 5 inches of mercury, (5) 6,500 parts of vinyl chloride were introduced.

Water was circulated round the jacket so as to maintain the temperature of the vessel at 50° C., while at the same time the contents were stirred by rotating the stirrer at 80 R. P. M.

After 2 hours the pressure in the vessel began to fall, whereupon a further 37,000 parts of vinyl chloride were injected into the vessel, together with (6) 218 parts of stearic acid and (7) 30 parts of an aqueous solution containing 10% of ammonia gas by weight. One hour later a further 90 parts of this solution (ingredient (7)) were injected.

When the pressure in the vessel again began to fall, a further 120 parts of the aforesaid ammonia solution (ingredient (7)) were injected and the remaining vinyl chloride was allowed to escape.

On opening the vessel it was found to contain a small proportion of coarse polymer mostly adhering to the sides of the vessel, and a latex of solids content 33% and particle diameter 0.93 micron (with a small proportion by weight of smaller particles, about 0.15 micron in diameter).

This latex was mixed with three others similarly prepared and spray-dried. After comminution the polymer was compounded with tricresyl phosphate to form a stable paste which had the following viscosities (in poises):

| Parts of Polymer | Parts of Plasticiser | Initial viscosity at 25° C. | Viscosity at 45° C. after ageing for 3 hours at 45° C. |
|---|---|---|---|
| 60 | 40 | 65 | 103 |

EXAMPLE III

Into the stainless steel pressure vessel used in Example I were introduced the following ingredients:

|  | Parts |
|---|---|
| (1) Distilled water | 65,000 |
| (2) Stearic acid | 200 |
| (3) Aluminum sulphate octadecahydrate | 2.6 |
| (4) Ammonium persulphate | 12 |
| (5) Vinyl chloride | 6,500 |

The vessel was purged with nitrogen before admitting the vinyl chloride.

Water was circulated round the jacket of the vessel so as to maintain its temperature at 50° C., while at the same time the contents were stirred by rotating the stirrer at 80 R. P. M.

After three hours the pressure in the vessel began to fall, whereupon (6) 30 parts of an aqueous solution containing 10% of ammonia gas by weight and a further 31,800 parts of vinyl chloride were injected. After another two hours, a further 90 parts of the ammonia solution (ingredient (6)) were injected.

When the pressure started to fall again, the remaining vinyl chloride was allowed to escape after the injection of a further 120 parts of the ammonia solution (ingredient (6)).

On opening the vessel, it was found to contain a small proportion of coarse polymer mainly adhering to the sides and bottom of the vessel and to the stirrer, while the rest of the product consisted of a latex of solids content 32% and particle diameter 1.25 microns (with a small proportion by weight of smaller particles about 0.2 micron in diameter).

The latex was spray-dried and the dried material comminuted in a mill prior to compounding with tricresyl phosphate to form stable pastes which had the following viscosities (in poises):

| Parts of Polymer | Parts of Plasticiser | Initial viscosity at 25° C. | Viscosity at 45° C. after ageing for 3 hours at 45° C. |
|---|---|---|---|
| 50 | 50 | 29 | 20 |
| 60 | 40 | 399 | 118 |

We claim:

1. In a process for the production of aqueous dispersions of a polymer of vinyl chloride by polymerizing a member of the group consisting of vinyl chloride and vinyl chloride together with up to its own weight of a copolymerizable ethylenically unsaturated material, the improvement comprising obtaining polymer particles of large uniform size by initiating the polymerization in the absence of an emulsifying agent and in an aqueous medium containing in solution a polymerization catalyst and an electrolyte yielding polyvalent metallic cations in an aqueous solution, and subsequently introducing an emulsifying agent after polymerization has commenced, but before the polymer dispersion thus formed begins to coagulate the amount of said electrolyte present at any stage of the process being insufficient to cause coagulation of the polymer dispersion, said emulsifying agent being introduced in an amount sufficient to provide mechanical stability but insufficient to impair the properties of the polymer contained in the dispersion produced.

2. A process according to claim 1 in which the emulsifying agent is introduced into the aqueous medium after the polymer dispersion is allowed to reach at least 0.5% by weight of the aqueous phase plus polymer but before the polymer content of said dispersion exceeds 8% by weight of the aqueous phase plus polymer.

3. A process according to claim 1 in which the electrolyte is selected from the group consisting of calcium and barium hydroxide and salts thereof.

4. A process according to claim 3 in which at least part of the electrolyte is precipitated from the aqueous medium before the end of polymerization by the addition of a member of the group consisting of stearic acid and water soluble salts thereof.

5. A process according to claim 1 in which the polymer content of the polymer dispersion is allowed to reach at least 0.5 to 1.0% by weight of the aqueous phase plus polymer before emulsifying agent is introduced into the aqueous medium.

6. A process according to claim 1 in which emulsifying agent is introduced into the aqueous medium before the polymer content of the polymer dispersion exceeds 5 to 8% by weight of the aqueous phase plus polymer.

7. A process according to claim 1 in which the emulsifying agent is prepared in situ by reacting an organic acid which is soluble in the monomer and which contains at least 6 carbon atoms in the hydrocarbon chain with a water soluble base.

8. A process according to claim 1 in which the amount of emulsifying agent introduced at any stage of the polymerisation is not substantially more than that necessary to prevent coagulation of the polymer dispersion.

9. A process according to claim 1 in which the electrolyte is one yielding divalent metallic cations in aqueous solution and in which the amount of electrolyte employed is that required to yield a cationic concentration of 0.00005 to 0.0008 gm.-ions percent by weight of the aqueous phase.

10. A process according to claim 9 in which all or part of the electrolyte is precipitated from the aqueous medium before the end of the polymerisation.

11. A process according to claim 1 in which the electrolyte is one yielding metallic cations having a valency of 3 or more.

12. A process according to claim 11 in which the electrolyte is present in solution in the aqueous medium throughout the duration of the polymerisation.

13. A process according to claim 11 in which the electrolyte is a salt of aluminium.

14. A process according to claim 1 in which further monomeric material is introduced into the polymerisation system after the commencement of the polymerisation.

15. A process according to claim 14 in which further vinyl chloride is introduced after, but only after, a decrease in the vapour pressure is observed.

16. A process according to claim 15 in which water is also introduced into the polymerisation system after the commencement of the polymerisation.

References Cited in the file of this patent

UNITED STATES PATENTS

| | | |
|---|---|---|
| 2,364,227 | Lewis | Dec. 5, 1944 |
| 2,377,752 | Britton | June 5, 1945 |
| 2,520,959 | Powers | Sept. 5, 1950 |
| 2,564,291 | Wolf | Aug. 14, 1951 |
| 2,579,908 | Davison | Dec. 25, 1951 |
| 2,674,593 | Condo | Apr. 6, 1954 |